Figure 1:
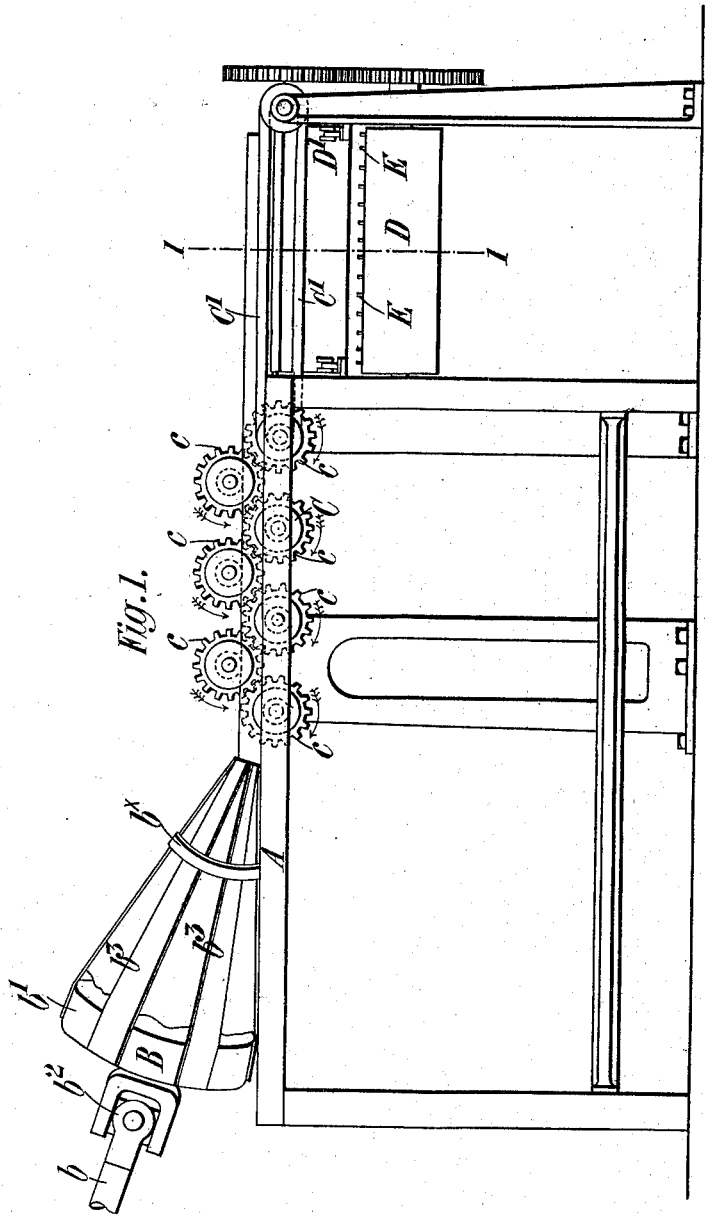

No. 755,343. PATENTED MAR. 22, 1904.
E. W. BARRATT.
MACHINE FOR ROLLING AND CUTTING CANDY.
APPLICATION FILED OCT. 16, 1903.
NO MODEL. 3 SHEETS—SHEET 2.

Witnesses:
Inventor
Edward William Barratt
By Dedersheim & Fairbanks
Attorneys.

No. 755,343. PATENTED MAR. 22, 1904.
E. W. BARRATT.
MACHINE FOR ROLLING AND CUTTING CANDY.
APPLICATION FILED OCT. 16, 1903.
NO MODEL. 3 SHEETS—SHEET 3.
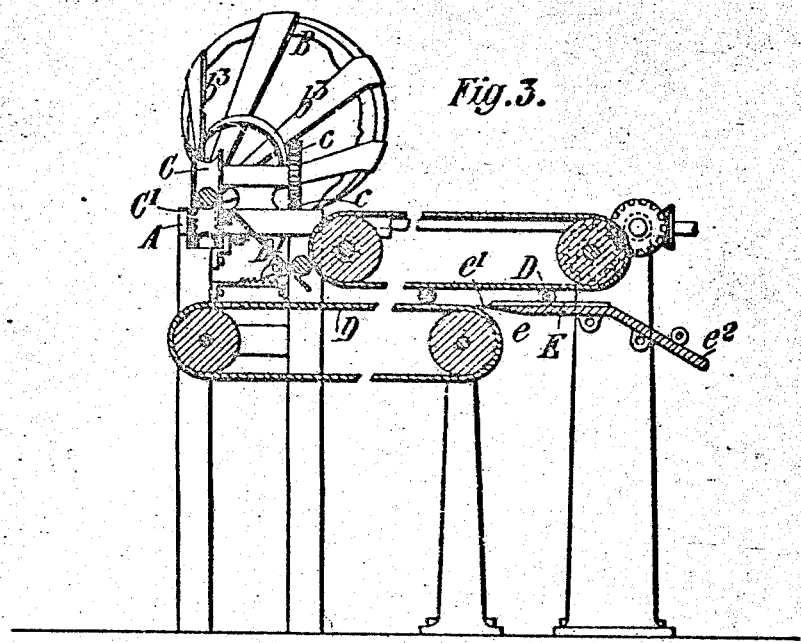
Fig. 3.
Fig. 4.
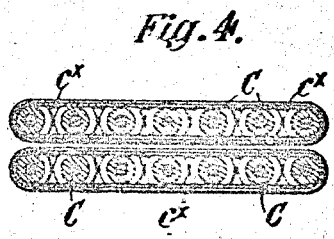
Witnesses:
Inventor:
Edward William Barratt
By Diedesheim + Fairbank
Attorneys No. 755,343. Patented March 22, 1904.

UNITED STATES PATENT OFFICE.

EDWARD WILLIAM BARRATT, OF WOOD GREEN, ENGLAND.

MACHINE FOR ROLLING AND CUTTING CANDY.

SPECIFICATION forming part of Letters Patent No. 755,343, dated March 22, 1904.

Application filed October 16, 1903. Serial No. 177,336. (No model.)

*To all whom it may concern:*

Be it known that I, EDWARD WILLIAM BARRATT, manufacturer, a subject of the King of Great Britain, residing at 1 Tower Terrace, Wood Green, in the county of Middlesex, England, have invented certain new and useful Improvements in Machines for Rolling and Cutting Candy, of which the following is a specification.

This invention relates to a machine for performing the operations known in the manufacture of sweetmeats as "rolling" and "cutting" candy. Heretofore it has been usual in carrying out these operations to proceed as follows: The sugar and other ingredients composing the candy are boiled until the mass assumes the proper consistency, when it is placed upon stone or metal slabs or benches. When sufficiently cooled, the mass is formed by rolling into a conical shape and maintained by an attendant in that shape by continuous rolling. Another attendant during this operation pulls the thin end of the conical mass into cylindrical or approximately cylindrical lengths of the required thickness, while a third attendant keeps the said lengths rolling, so as to preserve their cylindrical form, such operation being continued until the lengths have become cold enough to render further rolling useless. The said lengths are then cut into shorter lengths or sticks of the desired dimensions.

It is the chief object of my invention to effect the aforesaid operations of rolling and cutting mechanically, so that the amount of manual labor required therefor can be considerably reduced.

According to my invention the aforesaid conical plastic mass is placed within a conically-shaped receptacle, which is adapted to rest upon a bench and receive an oscillatory motion from suitable gearing in any appropriate manner. The connection of the said receptacle to the gearing from which it receives its oscillatory motion is of such a nature that the receptacle is capable of being turned about its axis by hand at intervals when desired. The plastic mass is led from said receptacle to means which are adapted to gradually reduce the diameter of the said mass and at the same time to withdraw or pull it from the receptacle in a continuous length. The plastic mass thus pulled is cut into sticks, which are then passed to means for reducing the sticks in diameter and keeping them in true cylindrical form. When the said sticks arrive at the end of the rolling means, they are acted upon by knives or cutters suitably arranged to incise them or cut them into pieces of the requisite dimensions.

In order that my said invention may be clearly understood and readily carried into effect, I will describe the same more fully with reference to the accompanying drawings, in which—

Figure 2:
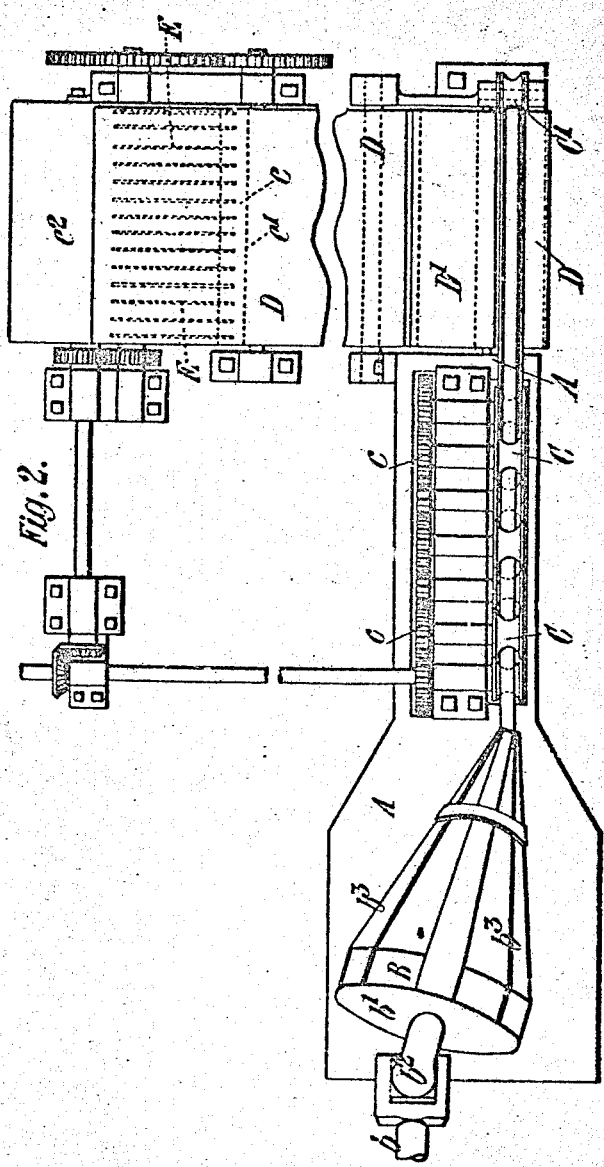

Figure 1 is a side elevation, and Fig. 2 a plan, of the apparatus or machine. Fig. 3 is a vertical section taken approximately on the line 1 1 of Fig. 1. Fig. 4 is a detail view showing a modification of the means employed for drawing or pulling the candy from the oscillatory receptacle.

A is the bench or table, and B the receptacle resting thereon. C C represent the means for pulling the candy. D D represent the rolling means, and E E the knives or cutters. The said receptacle receives its oscillatory motion from a shaft $b$, which is connected with the end piece or base $b'$ of the receptacle by a universal joint $b^2$. This joint permits the receptacle to be turned about its axis by hand at intervals when desired, as aforesaid. $b^3 b^3$ are resilient members which project from said end piece $b'$ and converge toward their outer or free ends. They impart to the said receptacle a conical form and by their resilience permit the plastic mass of candy to be introduced into said receptacle when the latter is to be charged. They also operate to retain the main body of the plastic candy within the receptacle while being drawn or pulled into a continuous length by the action of the pulling means C. In order to prevent the said resilient fingers from opening during the pulling of the plastic mass from the receptacle, they are embraced by a sliding ring $b^x$. The said pulling means comprise in the example of machine illustrated series of grooved wheels geared together by toothed wheels $c\ c$, the one nearest the receptacle B being the driver. The upper series of grooved wheels are thus caused to revolve in the opposite direction to that of the lower series, the two series operating conjointly to effect the "pulling" of the mass, which is necessary in order to withdraw the same from the receptacle B in a continuous length, as aforesaid. The extent to which these grooved wheels reduce the diameter of the plastic candy passing between them is in the example of the machine illustrated exceedingly small, as the surface speed of the grooved wheels is approximately the same throughout the series. I may, however, if desired, so arrange the series of grooved wheels that one pair will have a greater surface speed than another, the speed increasing toward the exit end of the series, in which case the length of the plastic candy would be subjected to a succession of drawing or pulling operations instead of only one drawing or pulling operation, as is the case when all the grooved wheels revolve at the same surface speed. I prefer to cover or coat the peripheries or grooved portions of these wheels with india-rubber or other soft resilient material to enable them to obtain a satisfactory and resilient grip upon the plastic candy and perform their pulling function to the best advantage. I may in some cases use bands $c^x$ of india-rubber or other suitable flexible material in conjunction with the grooved wheels, as shown in Fig. 4, for performing an advantageous pulling action on the plastic candy.

I do not confine myself to the particular arrangement of the grooved wheels shown in the drawings as they may be arranged in any appropriate manner, so long as they perform the aforesaid pulling action on the plastic candy.

As the length of plastic candy passes from the series of grooved wheels C, it reaches the upper surface of an endless band or conveyer C'', by which it is conveyed to the vicinity of the rolling means D. When the desired length of candy has passed onto the conveyer C'', it is severed by the workman from the continuous length of candy coming from the series of grooved wheels and is laterally ejected from the conveyer by the hand of the workman or otherwise and falls upon the rolling means D. The said rolling means comprise in the machine illustrated two bands, the lower one of which projects at the inlet end beyond the upper band and lies beneath the aforesaid conveyer C'', so that as the stick of candy is discharged from the latter it falls upon the lower band, and is thereby carried to the nip of the two bands. At the exit end of the said bands the upper band projects beyond the lower one, so as to lie immediately above the knives E. These knives are preferably in the form of serrated blades or saws, which are fixed longitudinally with respect to the bands in a block $e$, and thus lie at right angles to the sticks of candy as they come from the said bands. This block $e$ has a lip or guide $e'$, which acts to direct the sticks of candy onto the upper edges of the blades, and the pressure of the upper band on said sticks is sufficient to cause incisions to be made in them by the knives, so that said sticks may be readily broken into lengths on leaving the knives by the chute or inclined board $e^2$ and becoming hard by cooling.

In order to assist the sticks of candy to reach the bands D at right angles thereto, I may employ an incline D', down which the said sticks can roll after their ejection from the conveyer-band C'', and this incline may be hinged so as to permit of its being adjusted to suit sticks of different diameters—that is to say, its lower edge may be moved more or less away from the upper band, so as to make the space between said edge and said band suitable for the diameter of the stick that is to pass through said space.

In the drawings, Fig. 3, I have shown this incline D' hinged to a bar $d$ and provided on its under side with a pawl $d'$, adapted to engage with ratchet-teeth $d^2$. By raising said pawl the incline D' can be shifted into the desired angular position, in which it will be held by the reëngagement of the said pawl with the said ratchet-teeth.

When the series of grooved wheels C are provided with the bands $c^x$, as aforesaid, the lower band may be extended so as to serve as the conveyer C''.

Although I have shown both the bands D arranged at a lower level than the conveyer-band C'', it will be obvious that I may so arrange the said bands D that only the lower one occupies that position.

The aforesaid apparatus or machine is suitable for the production of rock or stick candy and also for the production of cream and lozenge or other paste rock-sticks.

What I claim, and desire to secure by Letters Patent of the United States, is—

1. A candy rolling and cutting machine consisting in the combination of a receptacle for the plastic candy, means for drawing or pulling the candy from said receptacle, means for rolling severed lengths of said drawn or pulled candy into cylindrical sticks, and means for incising or cutting said sticks.

2. A candy rolling and cutting machine consisting in the combination of a receptacle for the plastic candy, means for drawing or pulling the candy from said receptacle, means for rolling severed lengths of said drawn or pulled candy into cylindrical sticks, means for carrying the severed lengths from the drawing or pulling means to the rolling means, and means for incising or cutting said sticks.

3. A candy rolling and cutting machine consisting in the combination of a receptacle for the plastic candy, means for drawing or pulling the candy from said receptacle, means for rolling severed lengths of said drawn or pulled candy into cylindrical sticks, a band conveyer for carrying the severed lengths from the drawing or pulling means to the rolling means, and means for incising or cutting said sticks.

4. A candy rolling and cutting machine consisting in the combination of a receptacle for the plastic candy, a series of grooved wheels for drawing or pulling the candy from said receptacle, means for rolling severed lengths of said drawn or pulled candy into cylindrical sticks, a band conveyer for carrying the severed lengths from the drawing or pulling wheels to the rolling means, and means for incising or cutting said sticks.

5. A candy rolling and cutting machine consisting in the combination of a receptacle for the plastic candy, a series of grooved wheels for drawing or pulling the candy from said receptacle, endless bands between which severed lengths of said drawn or pulled candy are rolled into cylindrical sticks, a band conveyer for carrying the severed lengths from the drawing or pulling rollers to the endless bands, and means for incising or cutting said sticks.

6. A candy rolling and cutting machine consisting in the combination of an oscillatory receptacle for the plastic candy, means for drawing or pulling the candy from said receptacle, means for rolling severed lengths of said drawn or pulled candy into cylindrical sticks, and means for incising or cutting said sticks.

7. A candy rolling and cutting machine consisting in the combination of an oscillatory receptacle for the plastic candy, a universal joint connecting said receptacle with its actuating device to permit of its being turned about its axis by hand, means for drawing or pulling the candy from said receptacle, means for rolling severed lengths of said drawn or pulled candy into cylindrical sticks, and means for incising or cutting said sticks.

8. A candy rolling and cutting machine consisting in the combination of an oscillatory base-piece, resilient members projecting from said base-piece and converging at their free ends to form a conical receptacle for the plastic candy, a universal joint connecting said receptacle with its actuating device to permit of its being turned about its axis by hand, means for drawing or pulling the candy from said receptacle, means for rolling severed lengths of said drawn or pulled candy into cylindrical sticks, and means for incising or cutting said sticks.

9. A candy rolling and cutting machine consisting in the combination of an oscillatory base-piece, resilient converging members on said base-piece forming a conical receptacle for the plastic candy, a sliding ring embracing said resilient members, a universal joint connecting said receptacle with its actuating device to permit of its being turned about its axis by hand, means for drawing or pulling the candy from said receptacle, means for rolling severed lengths of said drawn or pulled candy into cylindrical sticks, and means for incising or cutting said sticks.

10. A candy rolling and cutting machine consisting in the combination of a receptacle for the plastic candy, a series of grooved wheels peripherally covered with flexible material for drawing or pulling the candy from said receptacle, means for rolling severed lengths of said drawn or pulled candy into cylindrical sticks, and means for incising or cutting said sticks.

11. A candy rolling and cutting machine consisting in the combination of a receptacle for the plastic candy, a series of grooved wheels surrounded by endless bands of flexible material for drawing or pulling the candy from said receptacle, means for rolling severed lengths of said drawn or pulled candy into cylindrical sticks, and means for incising or cutting said sticks.

12. A candy rolling and cutting machine consisting in the combination of a receptacle for the plastic candy, a series of grooved wheels peripherally covered with flexible material, means for rolling severed lengths of said drawn or pulled candy into cylindrical sticks, an endless-band conveyer driven from said series of grooved wheels for carrying the severed lengths to the rolling means, and means for incising or cutting said sticks.

13. A candy rolling and cutting machine consisting in the combination of a receptacle for the plastic candy, means for drawing or pulling the candy from said receptacle, means for rolling severed lengths of said drawn or pulled candy into cylindrical sticks, and a series of serrated blades situated at right angles to the cylindrical sticks for incising or cutting the latter.

14. A candy rolling and cutting machine consisting in the combination of a receptacle for the plastic candy, means for drawing or pulling the candy from said receptacle, a pair of endless bands for rolling severed lengths of said drawn or pulled candy into cylindrical sticks, the upper one of said bands extending beyond the lower one at the outlet end and the lower one extending beyond the upper one at the inlet end, means for carrying the severed lengths from the drawing or pulling means to the nip of said endless bands, a series of serrated blades supported beneath and in close proximity to the extended part of the upper endless band, and a chute down which the cylindrical sticks fall after being acted upon by said blades substantially as described.

15. A candy rolling and cutting machine consisting in the combination of a receptacle for the plastic candy, means for drawing or pulling the candy from said receptacle, a pair of endless bands for rolling severed lengths of the drawn or pulled candy into cylindrical sticks, a band conveyer for carrying the severed lengths from the drawing or pulling means to a point adjacent to the endless bands, an incline for conducting the said severed lengths from the aforesaid band conveyer to the nip of the endless bands, means for adjusting the position of said incline with respect to the endless bands, and means for incising or cutting said sticks substantially as described.

In testimony whereof I have hereunto set my hand, in presence of two subscribing witnesses, this 1st day of October, 1903.

EDWARD WILLIAM BARRATT.

Witnesses:
T. SELBY WARDLE,
GEORGE I. BRIDGES.